(12) United States Patent
Ghoshal et al.

(10) Patent No.: US 9,042,877 B1
(45) Date of Patent: May 26, 2015

(54) SYSTEM AND METHOD FOR RETROFITTING A BRANDING FRAMEWORK INTO A MOBILE COMMUNICATION DEVICE

(71) Applicant: Sprint Communications Company L.P., Overland Park, KS (US)

(72) Inventors: Jagannath Ghoshal, Overland Park, KS (US); John D. Sumler, Bonner Springs, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 122 days.

(21) Appl. No.: 13/899,566

(22) Filed: May 21, 2013

(51) Int. Cl.
*H04M 3/00* (2006.01)
*H04W 8/24* (2009.01)

(52) U.S. Cl.
CPC ..................................... *H04W 8/245* (2013.01)

(58) Field of Classification Search
None
See application file for complete search history.

(56) References Cited

U.S. PATENT DOCUMENTS

| | | | |
|---|---|---|---|
| 7,266,371 B1 | 9/2007 | Amin et al. | |
| 7,493,111 B2 | 2/2009 | Knowles | |
| 7,817,988 B2 | 10/2010 | Kruis et al. | |
| 7,904,895 B1 | 3/2011 | Cassapakis et al. | |
| 8,107,926 B2 | 1/2012 | Goto | |
| 8,185,101 B1 | 5/2012 | Wiseman et al. | |
| 8,260,281 B2 | 9/2012 | Urbanek | |
| 8,401,538 B2 | 3/2013 | Urbanek | |
| 8,401,595 B2 | 3/2013 | Zhu et al. | |
| 8,571,536 B2 | 10/2013 | Urbanek | |
| 8,612,967 B1 | 12/2013 | Delker | |
| 8,626,165 B1 * | 1/2014 | Narasimhan et al. | ...... 455/435.2 |
| 8,666,383 B1 | 3/2014 | Mauer et al. | |
| 8,825,039 B2 | 9/2014 | Mizuguchi | |
| 8,909,291 B1 | 12/2014 | Spanel et al. | |

(Continued)

FOREIGN PATENT DOCUMENTS

| | | |
|---|---|---|
| WO | 2012078753 A1 | 6/2012 |
| WO | 2013169983 A1 | 11/2013 |

(Continued)

OTHER PUBLICATIONS

Notice of Allowance dated Oct. 9, 2013, U.S. Appl. No. 13/335,941, filed Dec. 23, 2011.

(Continued)

*Primary Examiner* — Daniel Lai

(57) ABSTRACT

A method for retrofitting a branding framework into a mobile communication device is provided. The Method comprises the mobile communication device wirelessly receiving update instructions. In response to executing the update instructions, reducing the amount of memory in the mobile communication device allocated to a system memory partition. The method further comprises in response to executing the update instructions, reducing the amount of memory allocated to a user memory partition. The method further comprises determining the memory of the mobile communication device to allocate to create a carrier memory partition on the mobile communication device. The method further comprises installing a branding framework application into the system memory partition, wherein the branding framework application is configured to change the mobile communication device from a current brand to a different brand, wherein some information related to the current brand of the mobile communication device is stored in the carrier partition.

20 Claims, 7 Drawing Sheets

(56) References Cited

U.S. PATENT DOCUMENTS

| | | |
|---|---|---|
| 2002/0091931 A1 | 7/2002 | Quick, Jr. et al. |
| 2004/0033798 A1* | 2/2004 | Robin et al. .................. 455/419 |
| 2004/0116163 A1 | 6/2004 | Kim et al. |
| 2004/0137890 A1 | 7/2004 | Kalke |
| 2004/0137891 A1 | 7/2004 | Clark et al. |
| 2005/0197098 A1 | 9/2005 | Trossen |
| 2006/0135144 A1* | 6/2006 | Jothipragasam ............... 455/419 |
| 2006/0154651 A1 | 7/2006 | Knowles |
| 2006/0203722 A1* | 9/2006 | Oommen ....................... 370/229 |
| 2006/0208071 A1 | 9/2006 | Chang et al. |
| 2006/0236325 A1 | 10/2006 | Rao et al. |
| 2006/0246949 A1 | 11/2006 | Gupta et al. |
| 2007/0004404 A1 | 1/2007 | Buckley et al. |
| 2007/0082655 A1* | 4/2007 | Link et al. ..................... 455/410 |
| 2007/0099599 A1 | 5/2007 | Smith et al. |
| 2007/0129057 A1 | 6/2007 | Xu et al. |
| 2007/0130156 A1 | 6/2007 | Tenhunen et al. |
| 2007/0165654 A1 | 7/2007 | Chai et al. |
| 2007/0169084 A1* | 7/2007 | Frank et al. ................... 717/168 |
| 2007/0190939 A1 | 8/2007 | Abel |
| 2007/0250645 A1 | 10/2007 | Meadows et al. |
| 2007/0254635 A1 | 11/2007 | Montelius |
| 2008/0039114 A1 | 2/2008 | Phatak et al. |
| 2008/0046583 A1 | 2/2008 | Rao |
| 2008/0046880 A1* | 2/2008 | Jun et al. ...................... 717/173 |
| 2008/0046997 A1 | 2/2008 | Wang |
| 2008/0062900 A1 | 3/2008 | Rao |
| 2008/0065753 A1 | 3/2008 | Rao |
| 2008/0167027 A1 | 7/2008 | Gautier et al. |
| 2008/0171532 A1 | 7/2008 | Shieh et al. |
| 2008/0225806 A1 | 9/2008 | Arian et al. |
| 2008/0281511 A1 | 11/2008 | Miyata |
| 2008/0318547 A1 | 12/2008 | Ballou, Jr. et al. |
| 2009/0061840 A1 | 3/2009 | Fleischman et al. |
| 2009/0093242 A1 | 4/2009 | Bhalekar et al. |
| 2009/0106200 A1 | 4/2009 | Salinas et al. |
| 2009/0156209 A1 | 6/2009 | Franklin et al. |
| 2009/0239518 A1 | 9/2009 | Feuillette |
| 2009/0247124 A1 | 10/2009 | de Atley et al. |
| 2009/0260004 A1 | 10/2009 | Datta et al. |
| 2010/0048193 A1 | 2/2010 | Ortion et al. |
| 2010/0060456 A1 | 3/2010 | Forster |
| 2010/0075669 A1 | 3/2010 | Sparks et al. |
| 2010/0133335 A1 | 6/2010 | Maguid et al. |
| 2010/0136960 A1 | 6/2010 | Knezevic |
| 2010/0159876 A1 | 6/2010 | Brown et al. |
| 2010/0161724 A1 | 6/2010 | Sathyan et al. |
| 2010/0167696 A1 | 7/2010 | Smith et al. |
| 2010/0192120 A1 | 7/2010 | Raleigh |
| 2010/0203864 A1 | 8/2010 | Howard |
| 2010/0207742 A1 | 8/2010 | Buhot et al. |
| 2010/0222047 A1 | 9/2010 | Vanderlinden et al. |
| 2010/0262638 A1 | 10/2010 | Fitzgerald |
| 2010/0291898 A1* | 11/2010 | Sanding et al. ................. 455/411 |
| 2010/0311404 A1* | 12/2010 | Shi et al. ....................... 455/419 |
| 2010/0325622 A1 | 12/2010 | Morton |
| 2010/0332639 A1 | 12/2010 | Diaz et al. |
| 2011/0003590 A1 | 1/2011 | Yoon et al. |
| 2011/0014913 A1 | 1/2011 | Yoon et al. |
| 2011/0026501 A1 | 2/2011 | Sharaga et al. |
| 2011/0030062 A1 | 2/2011 | Hsu et al. |
| 2011/0035421 A1 | 2/2011 | Laird-McConnell et al. |
| 2011/0138074 A1 | 6/2011 | Onda et al. |
| 2011/0161659 A1 | 6/2011 | Himawan et al. |
| 2011/0165836 A1 | 7/2011 | Dixon et al. |
| 2011/0208338 A1 | 8/2011 | Eteminan et al. |
| 2011/0230136 A1 | 9/2011 | Washiro |
| 2011/0258249 A1 | 10/2011 | Biggs et al. |
| 2011/0263294 A1 | 10/2011 | Kim et al. |
| 2011/0306318 A1 | 12/2011 | Rodgers et al. |
| 2012/0036282 A1 | 2/2012 | Chen et al. |
| 2012/0046022 A1 | 2/2012 | Kalke et al. |
| 2012/0047227 A1 | 2/2012 | Haggerty et al. |
| 2012/0129513 A1 | 5/2012 | van der Laak |
| 2012/0129572 A1 | 5/2012 | Johnstone et al. |
| 2012/0135733 A1 | 5/2012 | Cormier et al. |
| 2012/0203824 A1 | 8/2012 | Oommen |
| 2012/0208511 A1 | 8/2012 | Vanderlinden et al. |
| 2012/0260095 A1 | 10/2012 | Von Hauck et al. |
| 2012/0276872 A1 | 11/2012 | Knauth et al. |
| 2012/0282891 A1 | 11/2012 | Mohammed et al. |
| 2013/0023235 A1 | 1/2013 | Fan et al. |
| 2013/0031191 A1 | 1/2013 | Bott |
| 2013/0046951 A1* | 2/2013 | Jones ............................ 711/171 |
| 2013/0065578 A1* | 3/2013 | Raleigh et al. ................. 455/419 |
| 2013/0085914 A1 | 4/2013 | McPherson et al. |
| 2013/0111461 A1 | 5/2013 | Zubas et al. |
| 2013/0137417 A1 | 5/2013 | Urbanek |
| 2013/0303142 A1 | 11/2013 | Burcham et al. |
| 2014/0080467 A1 | 3/2014 | Urbanek |
| 2014/0113610 A1* | 4/2014 | Ramprasad et al. ........... 455/418 |
| 2014/0206313 A1 | 7/2014 | Spanel et al. |
| 2014/0228012 A1 | 8/2014 | Annan et al. |
| 2014/0228042 A1 | 8/2014 | Annan et al. |
| 2014/0274032 A1 | 9/2014 | Shipley et al. |

FOREIGN PATENT DOCUMENTS

| | | |
|---|---|---|
| WO | 2014046814 A1 | 3/2014 |
| WO | WO2014113128 A1 | 7/2014 |
| WO | WO2014123758 A1 | 8/2014 |
| WO | WO2014123759 A1 | 8/2014 |
| WO | WO2014158430 A1 | 9/2014 |

OTHER PUBLICATIONS

Delker, Jason R., "Loading Branded Media Outside System Partition", filed Oct. 30, 2013 U.S. Appl. No. 14/066,947.
Foreign Communication from a Related Counterpart—International Search Report and Written Opinion, dated May 19, 2014, PCT/US14/13936, filed on Jan. 30, 2014.
Foreign Communication from a Related Counterpart—International Search Report and Written Opinion, dated May 14, 2014, PCT/US14/13939, filed on Jan. 30, 2014.
First Action Interview Pre-Interview Communication dated Apr. 23, 2014, U.S. Appl. No. 13/622,234, filed Sep. 18, 2012.
First Action Interview Pre-Interview Communication dated Apr. 3, 2014, U.S. Appl. No. 13/763,434, filed Feb. 8, 2013.
First Action Interview Pre-Interview Communication dated Sep. 22, 2014, U.S. Appl. No. 13/468,028, filed May 9, 2013.
Final Office Action dated Sep. 19, 2014, U.S. Appl. No. 13/622,234, filed Sep. 18, 2012.
FAIPP Pre-Interview Communication dated Mar. 19, 2014, U.S. Appl. No. 13/744,847, filed Jan. 18, 2013.
Notice of Allowance dated Aug. 4, 2014, U.S. Appl. No. 13/744,847, filed Jan. 18, 2013.
FAIPP Pre-Interview Communication dated Jul. 16, 2014, U.S. Appl. No. 13/744,861, filed Jan. 18, 2013.
Final Office Action dated Aug. 19, 2014, U.S. Appl. No. 13/763,434, filed Feb. 8, 2013.
Office Action dated Aug. 7, 2014, U.S. Appl. No. 13/831,504, filed Mar. 14, 2013.
Foreign Communication From a Related Counterpart Application, International Search Report and Written Opinion dated Jan. 24, 2014, International Application No. PCT/US13/68981 filed on Nov. 7, 2013.
Spanel, Robert L., et al., Patent Application entitled "Dynamic Remotely Managed SIM Profile" U.S. Appl. No. 13/744,847, filed Jan. 18, 2013.
Urbanek, Robert E., "Delivery of Branding Content and Customizations to a Mobile Communication Device", filed Oct. 23, 2013, U.S. Appl. No. 14/060,712.
Urbanek, Robert E., "Delivery of Branding Content and Customizations to a Mobile Communication Device", filed , 201, International Serial No. PCT/US14/56778.
Urbanek, Robert E., "Implementation of Remotely Hosted Branding Content and Customizations", filed Oct. 23, 2013, U.S. Appl. No. 14/085,474.
Urbanek, Robert E., "Subscriber Identity Module Virtualization", filed Nov. 20, 2013, U.S. Appl. No. 14/060,719.

(56) References Cited

OTHER PUBLICATIONS

Indurkar, Dhananjay, "System and Method of Branding a Device Independent of Device Activation", filed Jan. 24, 2014, U.S. Appl. No. 14/163,035.
Sumner, Bret D., "Directing Server Connection Based on Location Identifier", filed Aug. 15, 2013, U.S. Appl. No. 13/968,259.
Abou-El-Ella, Hassan, et al., "Segmented Customization Payload Delivery", filed Aug. 27, 2013, U.S. Appl. No. 14/010,518.
Sumner, Bret D., "Segmented Customization Package Within Distributed Server Architecture", filed Aug. 27, 2013, U.S. Appl. No. 14/010,522.
Masterson, Michelle E., et al., "Development and Testing of Payload Receipt by a Portable Electronic Device", filed Aug. 27, 2013, U.S. Appl. No. 14/010,523.
Masterson, Michelle E., et al., "System and Methods for Deferred and Remote Device Branding", filed Aug. 27, 2013, U.S. Appl. No. 14/010,524.
Masterson, Michelle E., et al., "System and Methods for Deferred and Remote Device Branding", filed Jul. 16, 2014, International Serial No. PCT/US14/46773.
Callan, Jeffery S., et al., "Delivery of Oversized Branding Elements for Customization", filed Nov. 6, 2013, U.S. Appl. No. 14/073,321.
Indurkar, Dhananjay, "Background Delivery of Device Configuration and Branding", filed Jan. 16, 2014, U.S. Appl. No. 14/157,507.
Ahn, Chul Jin, et al., "Separation of Client Identification Composition from Customization Payload to Original Equipment Manufacturer Layer", filed Nov. 8, 2013, U.S. Appl. No. 14/075,687.
Ghoshal, Jagannath, et al., "Multiple Carrier Partition Dynamic Access on a Mobile Device", filed Jun. 5, 2014, U.S. Appl. No. 14/297,429.
Indurkar, Dhananjay, "Activation Sequence Using Permission Based Connection to Network", filed Jan. 24, 2014, U.S. Appl. No. 14/163,041.
Ahn, Chul Jin, et al., "Customization for Preloaded Applications", filed Mar. 31, 2014, U.S. Appl. No. 14/231,718.
Foreign Communication from a Related Counterpart—International Search Report and Written Opinion, dated Jun. 3, 2014, PCT/US14/16650, filed on Feb. 16, 2014.
First Action Interview Pre-Interview Communication dated Aug. 13, 2013, U.S. Appl. No. 13/335,941, filed Dec. 23, 2011.
Foreign Communication from a Related Counterpart—International Search Report and Written Opinion, PCT/US2011/063736.
Notice of Allowance dated Apr. 26, 2012, U.S. Appl. No. 12/962,620, filed Dec. 7, 2010.
Notice of Allowance dated Nov. 2, 2012, U.S. Appl. No. 13/556,202, filed Jul. 24, 2012.
First Action Interview Pre-Interview Communication dated Feb. 25, 2013, U.S. Appl. No. 13/149,505, filed May 31, 2013.
First Action Interview Office Action dated May 8, 2013, U.S. Appl. No. 13/149,505, filed May 31, 2013.
Urbanek, Robert E., "System and Method of Wireless Communication", filed Dec. 7, 2010, U.S. Appl. No. 12/962,620.
Urbanek, Robert E., "System and Method for Generic Mobile Phone Configuration", filed Jul. 24, 2012, U.S. Appl. No. 13/556,202.
Urbanek, Robert E., "System and Method for Generic Mobile Phone Configuration", filed Jan. 28, 2013, U.S. Appl. No. 13/752,386.
Delker, Jason R., "Loading Branded Media Outside System Partition", filed May 31, 2011 U.S. Appl. No. 13/149,505.
Burcham, Robert H., et al., "Self-Identification of Brand and Branded Firmware Installation in a Generic Electronic Device", filed May 9, 2012 U.S. Appl. No. 13/468,028.
Mauer, Brian D., et al., "Automatic Branding of Generic Applications", filed Dec. 23, 2011 U.S. Appl. No. 13/335,941.
Urbanek, Robert E, "Generic Mobile Devices Customization Framework", filed Sep. 18, 2012, U.S. Appl. No. 13/622,234.
Annan, Brandon C., et al.,"System and Method of Branding and Labeling a Mobile Device", filed Mar. 15, 2013, U.S. Appl. No. 13/844,104.
Annan, Brandon C., et al.,"System and Method of Storing Service Brand Packages on a Mobile Device", filed Feb. 8, 2013, U.S. Appl. No. 13/763,428.
Annan, Brandon C., et al.,"System and Method of Provisioning and Reprovisioning a Mobile Device Based on Self-locating", filed Feb. 8, 2013, U.S. Appl. No. 13/763,434.
Annan, Brandon C., et al.,"Electronic Fixed Brand Labeling", filed Feb. 8, 2013, U.S. Appl. No. 13/763,443.
Ghoshal, Jagannath, et al.,"Rebranding a Portable Electronic Device While Maintaining User Data", filed May 22, 2013, U.S. Appl. No. 13/899,567.
Foreign Communication from a Related Counterpart Application, "Preliminary Report on Patentability", dated Jun. 20, 2013, PCT/US2011/063736 filed on Dec. 7, 2011.
Foreign Communication from a Related Counterpart—International Search Report and Written Opinion, dated Jul. 24, 2013, PCT/US13/40278, filed on May 9, 2013.
Notice of Allowance dated Jun. 21, 2013, U.S. Appl. No. 13/752,386, filed Jan. 28, 2013.
Notice of Allowance dated Aug. 9, 2013, U.S. Appl. No. 13/149,505, filed May 31, 2013.
Foreign Communication from a Related Counterpart—International Search Report and Written Opinion, dated Nov. 14, 2013, PCT/US13/55023, filed on Aug. 15, 2013.
Mauer, Brian D., et al., "Automatic Branding of Generic Applications", filed Jan. 10, 2013, U.S. Appl. No. 14/152,627.
Urbanek, Robert E., "Generic Mobile Devices Customization Framework", filed Aug. 15, 2013, International Serial No. PCT/US13/55023.
Annan, Brandon C., et al.,"System and Method of Storing Service Brand Packages on a Mobile Device", filed Jan. 30, 2014, International Serial No. PCT/US14/13936.
Annan, Brandon C., et al.,"System and Method of Provisioning and Reprovisioning a Mobile Device Based on Self-locating", filed filed Jan. 30, 2014, International Serial No. PCT/US14/13939.
Advisory Action dated Dec. 17, 2014, U.S. Appl. No. 13/622,234, filed Sep. 18, 2012.
Notice of Allowance dated Nov. 22, 2014, U.S. Appl. No. 13/744,861, filed Jan. 18, 2013.
First Action Interview Pre-Interview Communication dated Oct. 22, 2014, U.S. Appl. No. 13/763,428, filed Feb. 8, 2013.
Notice of Allowance dated Dec. 29, 2014, U.S. Appl. No. 13/831,504, filed Mar. 14, 2013.
Foreign Communication from a Related Counterpart Application, "Preliminary Report on Patentability," dated Nov. 20, 2014, PCT/US13/40278 filed on May 9, 2013.
Foreign Communication from a Related Counterpart—International Search Report and Written Opinion, dated Dec. 17, 2014, PCT/US14/46773, filed on Jul. 16, 2014.
Foreign Communication from a Related Counterpart—International Search Report and Written Opinion, dated Dec. 30, 2014, PCT/US14/56778, filed Sep. 22, 2014.
Spanel, Robert L., et al., Patent Application entitled "Dynamic Remotely Managed SIM Profile" U.S. Appl. No. 14/522,586, filed Oct. 24, 2014.
Urbanek, Robert E., "Delivery of Branding Content and Customizations to a Mobile Communication Device", filed Sep. 22, 2014, International Serial No. PCT/US14/56778.
Koller, Gary D., et al., "Out of the Box Experience (OOBE) Country Choice Using Wi-Fi Layer Transmission," filed Oct. 31, 2014, U.S. Appl. No. 14/530,666.
Blinn, Benjamin P., et al. "System and Method of Efficient Mobile Device Network Brand Customization," filed Sep. 2, 2014, U.S. Appl. No. 14/475,399.

\* cited by examiner

SYSTEM AND METHOD FOR RETROFITTING A BRANDING FRAMEWORK INTO A MOBILE COMMUNICATION DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are electronic devices used for mobile voice or data communication based on a network connectivity provided by base transceiver stations also known as cell towers or cell sites. Electronic devices may have a system memory partition which stores an operating system package and fundamental communication applications for operating the electronic device. The operating system protects the system partition by restricting read/write access. Electronic devices may also have a user memory partition which provides storage for user data such as third party applications downloaded by an electronic device user. The operating system may permit unrestricted read/write access to the user memory partition.

SUMMARY

In an embodiment, a method of retrofitting a branding framework into a mobile communication device is disclosed. The method comprises the mobile communication device wirelessly receiving update instructions. In response to executing the update instructions, reducing the amount of memory in the mobile communication device allocated to a system memory partition. After reducing the amount of memory allocated to the system memory partition, creating a carrier memory partition in the mobile communication device at least in part from the reduced amount of memory allocated to the system memory partition, and installing a branding framework application into the system memory partition, wherein the branding framework application is configured to change the mobile communication device from a current brand to a different brand.

In an embodiment, a method of retrofitting a branding framework into a mobile communication device is disclosed. The method comprises a mobile communication device wirelessly receiving update instructions. In response to executing the update instructions, reducing the amount of memory in the mobile communication device allocated to a system memory partition. The method further comprising in response to executing the update instructions, reducing the amount of memory allocated to a user memory partition. After reducing the amount of memory allocated to the system memory partition and/or after reducing the amount of memory allocated to the user memory partition, creating a carrier memory partition in the mobile communication device from the reduced amount of memory allocated to the system memory partition and/or from the reduced amount of memory allocated to the user memory partition. The method further comprises installing a branding framework application into the system memory partition, wherein the branding framework application is configured to change the mobile communication device from a current brand to a different brand, wherein some information related to the current brand of the mobile communication device is stored in the carrier memory partition.

In an embodiment, a method of retrofitting a branding framework into a mobile communication device is disclosed. The method comprises determining an amount of memory of the mobile communication device to allocate to create a carrier memory partition on the mobile communication device. The method further comprises identifying memory of the mobile communication device allocated to a system memory partition of the mobile communication device for reallocating to the carrier memory partition. The method further comprises creating update instructions that, when executed on the mobile communication device, reduce the amount of memory in the mobile communication device allocated to a system memory partition. After reducing the amount of memory allocated to the system memory partition, creating the carrier memory partition in the mobile communication device, at least in part from the reduced amount of memory allocated to the system memory partition. The method further comprises installing a branding framework application into the system memory partition, wherein the branding framework application is configured to change the mobile communication device from a current brand to a different brand, wherein some information related to the current brand of the mobile communication device is stored in the carrier partition. The method further comprises wirelessly transmitting the update instructions to the mobile communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
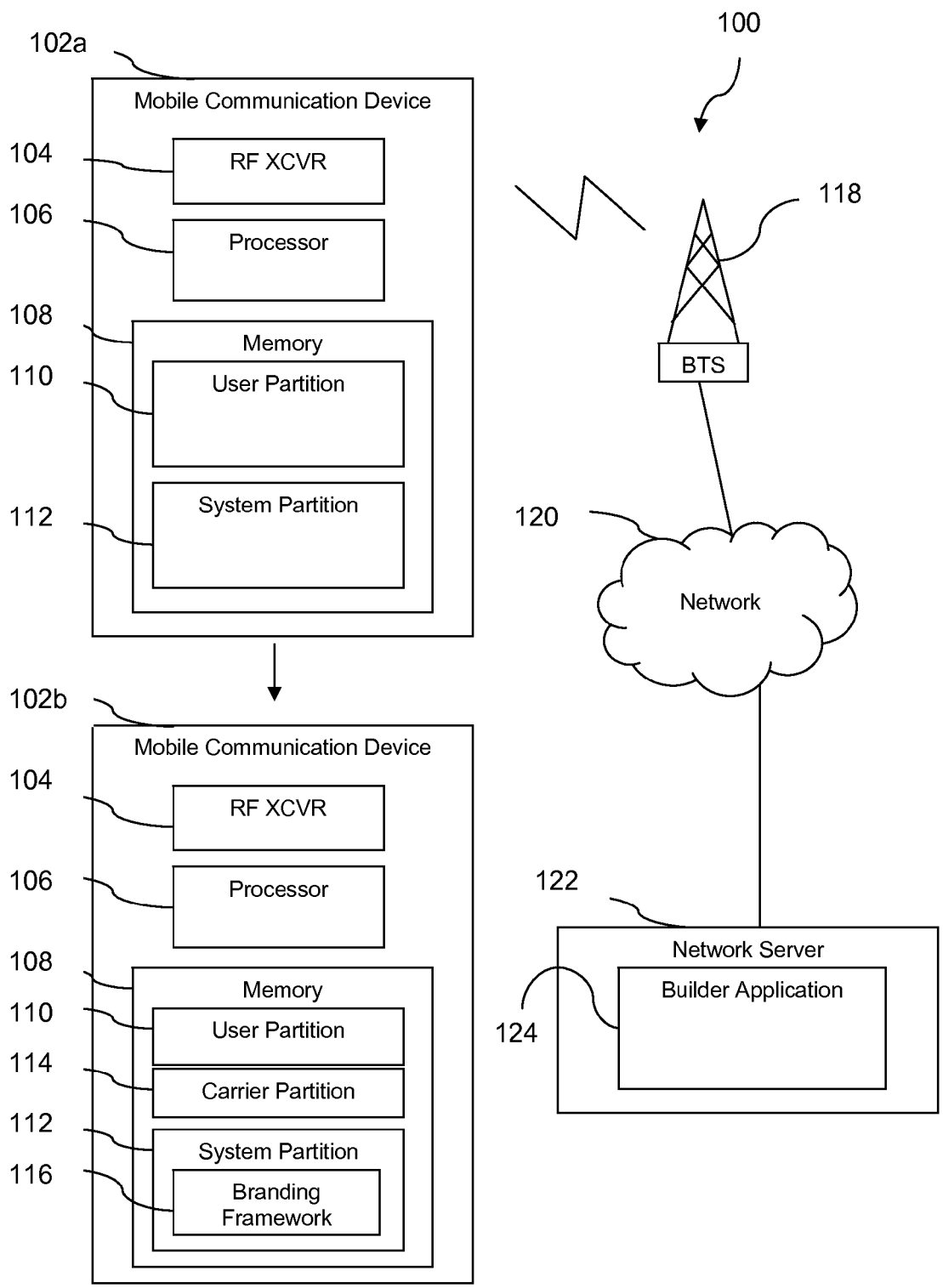
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A method for retrofitting a branding framework into a mobile communication device is disclosed. Unique problems may occur for wireless communication service providers that own multiple different brands or service marks and may distribute multiple dedicated brand packages for a same model of mobile communication device. For example, a primary wireless communication service provider that owns three alternative brands of wireless communication service providers may customize a single model of mobile communication device with any of three different branding packages comprising brand specified versions of start-up screens, ringtones, internet browsers, etc. Unique wireless communication service brand packages for the same mobile communication device may lead to separate stock keeping units (SKUs) for the same model of mobile communication device for different wireless communication service brand networks, introducing complexity to inventory management and distribution. A service brand package may be stored in a system memory partition of the mobile communication device so that in order to update their service brand package of the mobile communication device the service provider may be obligated to coordinate with a manufacturer's update. As a result of previous distribution, mobile communication devices without the capability to store multiple wireless service communication brands may have been distributed from the original equipment manufacturer (OEM) already branded.

A mobile communication device may have memory established as a system memory partition and a user memory partition. An operating system of the mobile communication device may restrict write access to the system memory partition and may prevent the contents of the system memory partition being erased during reset operations, for example resetting to factory defaults. For example, a user may be prevented from writing to the system memory partition and/or from causing writing to the system memory partition. By contrast, the operating system of the mobile communication device may allow unrestricted write access to the user memory partition. For example, a user of the mobile communication device may be permitted by the operating system to write information into the user memory partition, at least indirectly by exercising user interface control selections, for example entering personal contacts, installing third party applications, downloading ring tones, and the like. During a reset, for example during a reset to factory defaults, the information in the user memory partition may be deleted by the operating system. The ANDROID operating system used by some mobile communication devices may establish a system memory partition and a user memory partition.

The present disclosure teaches how a branding framework may be retrofitted onto existing branded mobile communication devices through a wireless update from the wireless communication service provider. During the wireless update, a branding framework application may be downloaded onto the mobile communication device and stored in a system memory partition. In an embodiment, as part of the wireless update and/or upgrade, the memory allocated to the system memory partition is reduced to expropriate memory for the creation of a carrier memory partition which may be used to hold branding information that may be used by the wireless communication service provider, for example to brand or rebrand a mobile communication device. If there is an insufficient amount of memory in the system memory partition to allocate the carrier memory partition, for example unutilized memory, memory allocated to a user memory partition may also be reduced for the creation of the carrier memory partition.

The operating system, for example a version of the operating system that has been updated during the installation of the branding framework, may provide write access to the carrier memory partition to privileged users or automated processes. For example, an individual providing a carrier memory partition key or password, for example an employee or contractor associated with a wireless communication service provider, may be allowed by the operating system to write to the carrier memory partition. An automated procedure or function executed on the mobile communication device that presents a carrier memory partition key or password, for example a script wirelessly transmitted to the mobile communication device, may be permitted to write to the carrier memory partition. The carrier memory partition may be used to store branding information. The carrier memory partition further may be used to store other information unrelated to branding and/or customization content. For further details about carrier memory partitions, see U.S. patent application Ser. No. 13/763,428, filed Feb. 8, 2013, entitled "System and Method of Storing Service Brand Packages On a Mobile Device," by Brandon C. Annan, et al., which is hereby incorporated by reference in its entirety.

The carrier memory partition may be created from portions of memory expropriated from either the system memory partition and/or the user memory partition. The amount of memory allocated to the carrier memory partition may vary depending on the partition that is used and the model of mobile communication device that is used. The system memory partition may have but is not limited to one and a half gigabytes or more space, and the user memory partition may have but is not limited to eight gigabytes of memory or more space.

During the carrier memory partition creation process, some personal user data that is stored on the branded mobile communication device may be erased, for example data stored in an area of the user memory partition that is expropriated. This data might include but is not limited to a user's personal contacts, third party applications, pictures, videos, etc. It is possible to salvage this data with several methods. One method might involve using a secure digital (SD) card that a user may install into the mobile communication device. Another method might involve copying at least some of the stored user data and storing that data on a server accessible via a network. The update proceeds, erasing some of the consumer's personal data. Once the update is complete and the carrier memory partition is created, the copied data may then be restored from the server network in the mobile communication device's available memory in the user memory partition.

The retrofitting of the branding framework and the creation of the carrier memory partition may allow the system memory partition to keep its base functionality, while the system memory partition may refer to the carrier memory partition for information such as changeable media, configuration settings, etc. This may allow for multiple parallel branding in the carrier memory partition, and confirm and/or enable/support for an alternative brand or configuration on the mobile communication device. Once the branding framework and carrier memory partition are on the mobile communication device, all of the aforementioned functions may be accomplished without updating the system memory partition, eliminating the process of the mobile communication device going through the manufacturer, and at the same time avoiding problems and impacts that may occur in the identifying information of the operating system of the mobile communication device caused by factory resets and system memory firmware updates.

The wireless update may provide users and/or wireless communication service providers freedom to choose the brand of mobile communication device that they desire, without having to change their mobile communication device if they have the desire to switch their wireless communication service provider to another alternative wireless communication service provider. This feature may provide users and/or wireless communication service providers the freedom to access their service brand packages whenever they desire without having to coordinate for example with either another service brand or the mobile communication device manufacturer. This feature may provide further control to carriers to permit only select wireless service providers to install selected service brand packages.

Turning now to FIG. 1, a communication system 100 is described. The system 100 comprises a mobile communication device 102, a base transceiver station (BTS) 118, a network 120, and a network server 122. The mobile communication device 102 may be a mobile phone, a personal digital assistant (PDA), a media player, or other communication enabled portable electronic device. In an embodiment, the mobile communication device 102 may be implemented as a handset. Details of handsets are discussed further hereinafter. Two states of the mobile communication device 102—the mobile communication device 102a in a first state and the mobile communication device 102b in a second state—are illustrated in FIG. 1, as described in more detail hereinafter. The mobile communication device 102a in the first state does not have a branding framework installed; the mobile communication device 102b in the second state has had a branding framework 116 installed and a carrier memory partition 114 created, as described further hereinafter.

The base transceiver station (BTS) 118 may provide a wireless communication link to the mobile communication device 102 and may couple the mobile communication device 102 to the network 120. In an embodiment, the base transceiver station 118 may provide a wireless communication link to the mobile communication device 102 according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless protocol. While a single base transceiver station 118 is illustrated in FIG. 1, it is understood that the communication system 100 may comprise any number of base transceiver stations 118 and any number of mobile communication devices 102. The network 118 may be a public communication network, a private communication network, or a combination thereof.

The mobile communication device 102a may comprise a radio frequency transceiver (RF XCVR) 104, a processor 106, and a memory 108. The memory 108 may also comprise of a user memory partition 110, and a system memory partition 112. The memory 108 may further comprise a carrier memory partition 114, for example in device 102b. The presence of a carrier memory partition 114 and a branding framework 116 may be the case after an update process and/or upgrade process has been completed, for example the update shown in FIG. 1 of mobile communication device 102a which is reconfigured to 102b which is described in detail hereinafter. The system memory partition 112 may also further comprise a branding framework 116 as shown in 102b. The system memory partition 112 may store at least an operating system package, and the carrier memory partition 114 may store one or more brand packages. In an embodiment, the size of the user memory partition 110 may be at least three times the size of the system memory partition 112, and the system memory partition 112 may be at least three times the size of the carrier partition 114. The network server 122 may comprise of a builder application 124. The network server 122 may be implemented as a computer system. Computers are discussed further in more detail hereinafter.

The builder application 124 executes on the network server 122 and analyzes the memory 108, user memory partition 110, and the system memory partition 112; designing how to restructure the memory 108 to expropriate memory 108 for the carrier memory partition 114, and creating instructions that when executed in the mobile communication device 102 reallocates memory 108. In an embodiment, the carrier memory partition 114 may be created from portions of memory solely from the system memory partition 112. In another embodiment, the carrier memory partition 114 may be created from portions of memory 108 solely from the user memory partition 110. In another further embodiment, the carrier memory partition 114 may be created from portions of memory 108 from both the system memory partition 112 and the user memory partition 110

The carrier memory partition 114 may be created from a contiguous block of memory 108. Alternatively, the carrier memory partition 114 may be created from two or more non-contiguous blocks of memory 108. For example, the carrier memory partition 114 may be created from two or more non-contiguous blocks of the system memory partition 112, two or more non-contiguous blocks of the user memory partition 110, of two or more non-contiguous blocks of memory located in both the system memory partition 112 and the user memory partition 110. The application 124 may cause the branding framework 116 to be transmitted to and installed on the mobile communication device 102 or may send a notification to the mobile communication device 102 to itself retrieve and load the branding framework 116.

In an embodiment, after installing the branding framework 116 onto the mobile communication device 102, the mobile communication device 102 may receive an open mobile alliance device management (OMA DM) payload; store some of the OMA DM payload contents into the newly created carrier partition 114; and based on the OMA DM payload, rebrand the mobile communication device 102 from a first brand device to a second branded device, wherein the rebranding is performed by the branding framework 116 at least in part by retrieving some of the OMA DM payload contents stored in the carrier partition 114.

Figure 2:
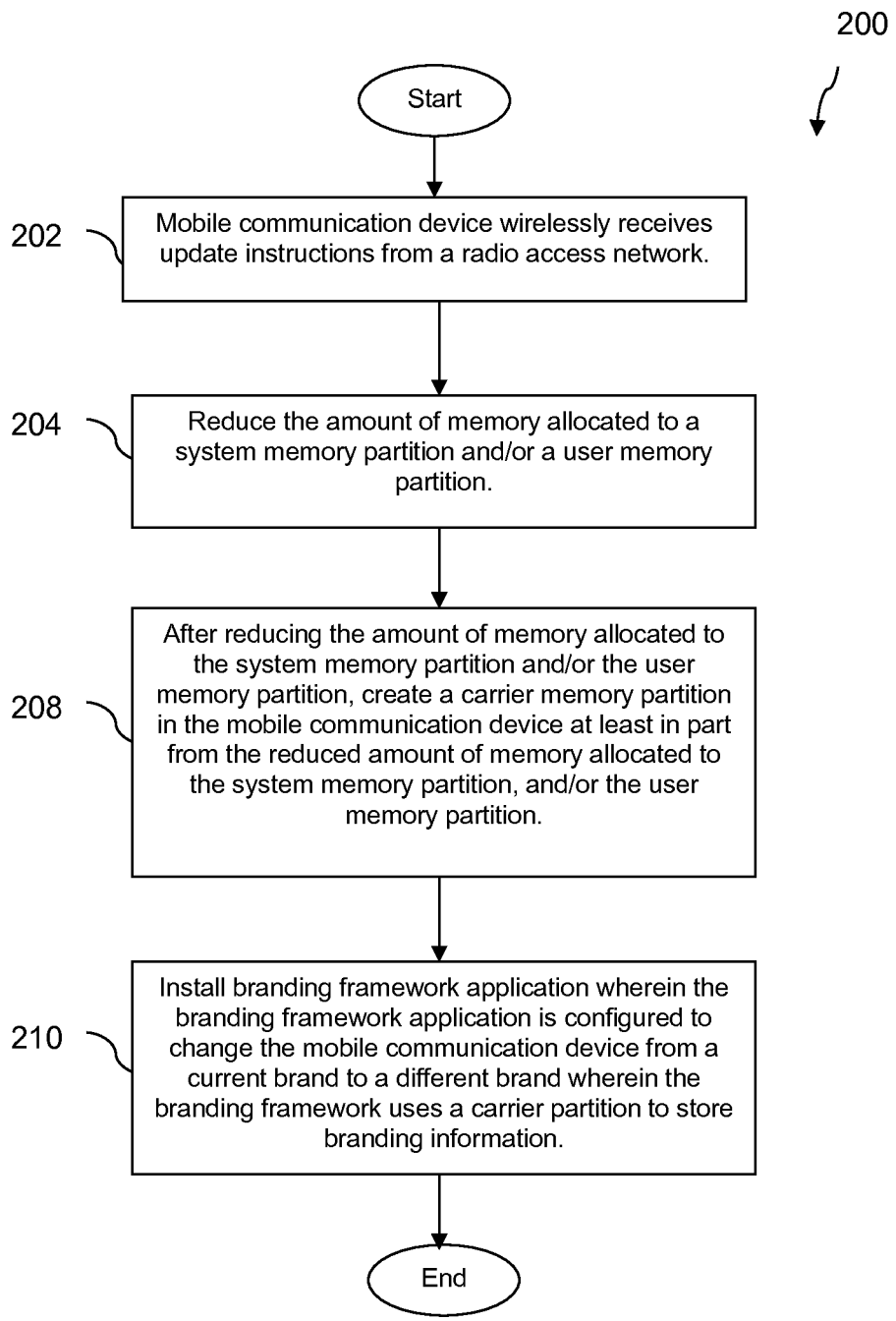
FIG. 2 is a flow chart of a method according to an embodiment of the disclosure.

In FIG. 2 a method 200 is described. At block 202, a mobile communication device wirelessly receives update instructions from a radio access network. At block 204, the amount of memory allocated to a system memory partition is reduced. Alternatively, at block 204, the amount of memory allocated to a user memory partition is reduced. Alternatively, at block 204 the amount of memory allocated to the system memory partition and the amount of memory allocated to the user memory partition are both reduced. At block 208, a carrier memory partition is created in the mobile communication device at least in part from the reduced amount of memory allocated to the system memory partition, and/or the user memory partition. In an embodiment, the carrier memory partition may be created from portions of memory solely from the system memory partition. In another embodiment, the carrier memory partition may be created from portions of memory solely from the user memory partition. In another further embodiment, the carrier memory partition may be created from portions of memory from both the system memory partition and/or the user memory partition. At block 210, a branding framework application is installed into the mobile communication device, wherein the branding framework application is configured to change the mobile communication device from a current brand to a different brand wherein the branding framework uses the carrier partition to store the branding information.

Figure 3:
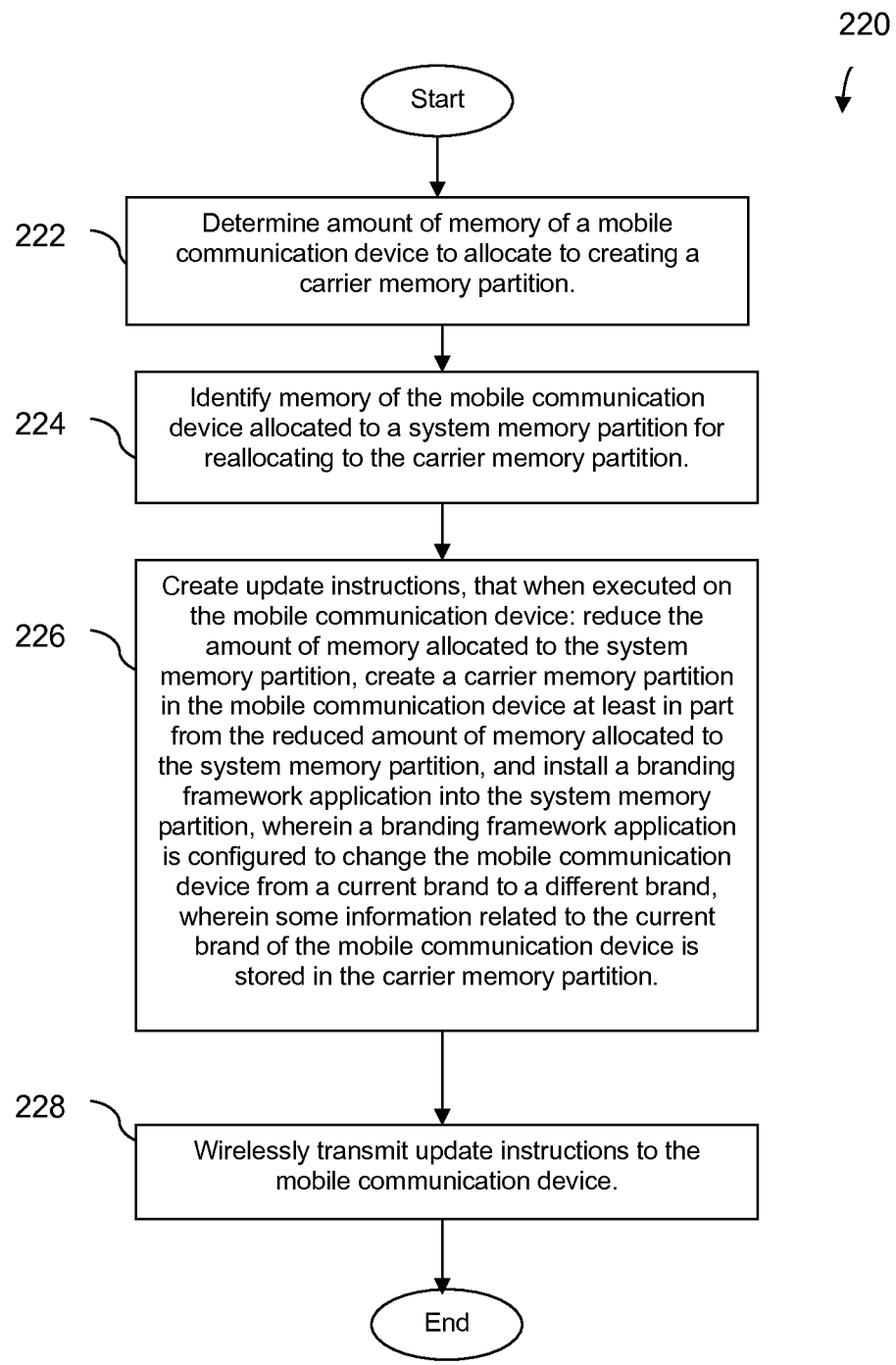
FIG. 3 is a flow chart of a method according to an embodiment of the disclosure

In FIG. 3, a method 220 is described. At block 222, the amount of memory of a mobile communication device is determined to allocate to create a carrier memory partition. At block 224, the amount of memory of the mobile communication device allocated to a system memory partition is identified for reallocation to the carrier memory partition. At block 226, update instructions are created, that when executed on the mobile communication device: may reduce the amount of memory allocated to the system memory partition, may create the carrier memory partition in the mobile communication device at least in part from the reduced amount of memory allocated to the system memory partition, and may install a branding framework application into the system memory partition, wherein the branding framework application is configured to change the mobile communication device from a current brand to a different brand, wherein some information related to the current brand of the mobile communication device is stored in the carrier memory partition. At block 228, update instructions are wirelessly transmitted to the mobile communication device.

Figure 4:
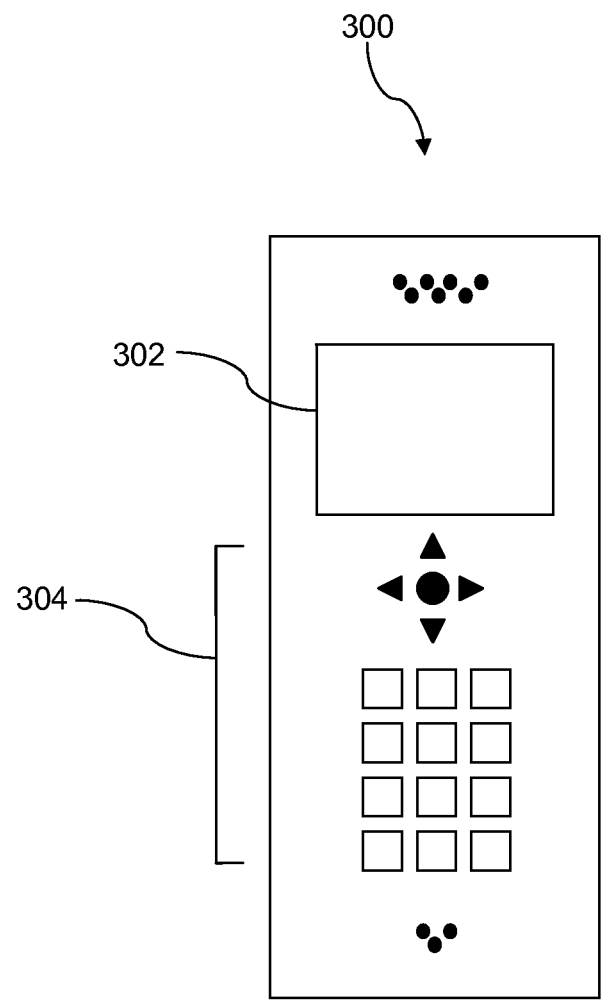
FIG. 4 is an illustration of a mobile communication device according to an embodiment of the disclosure.

FIG. 4 depicts a mobile device 300, which is operable for implementing aspects of the present disclosure, but the present disclosure should not be limited to these implementations. Though illustrated as a mobile phone, the mobile device 300 may take various forms including a wireless handset, a pager, a personal digital assistant (PDA), a gaming device, or a media player. The mobile device 300 includes a display 302 and a touch sensitive surface and/or keys 304 for input by a user. The mobile device 300 may present options for a user to select, controls for the user to actuate, and/or cursors or other indicators for the user to direct. The mobile device 300 may further execute one or more software or firmware applications in response to user commands. These applications may configure the mobile device 300 to perform various customized functions in response to user interaction. Additionally, the mobile device may be programmed and/or configured over-the-air, for example from a wireless base station, a wireless access point, or a peer mobile device 300. The mobile device 300 may execute a web browser application which enables the display 302 to show a web page. The web page may be obtained via wireless communications with a base transceiver station, a wireless network access node, a peer mobile device 300 or any other wireless communication network or system.

Figure 5:
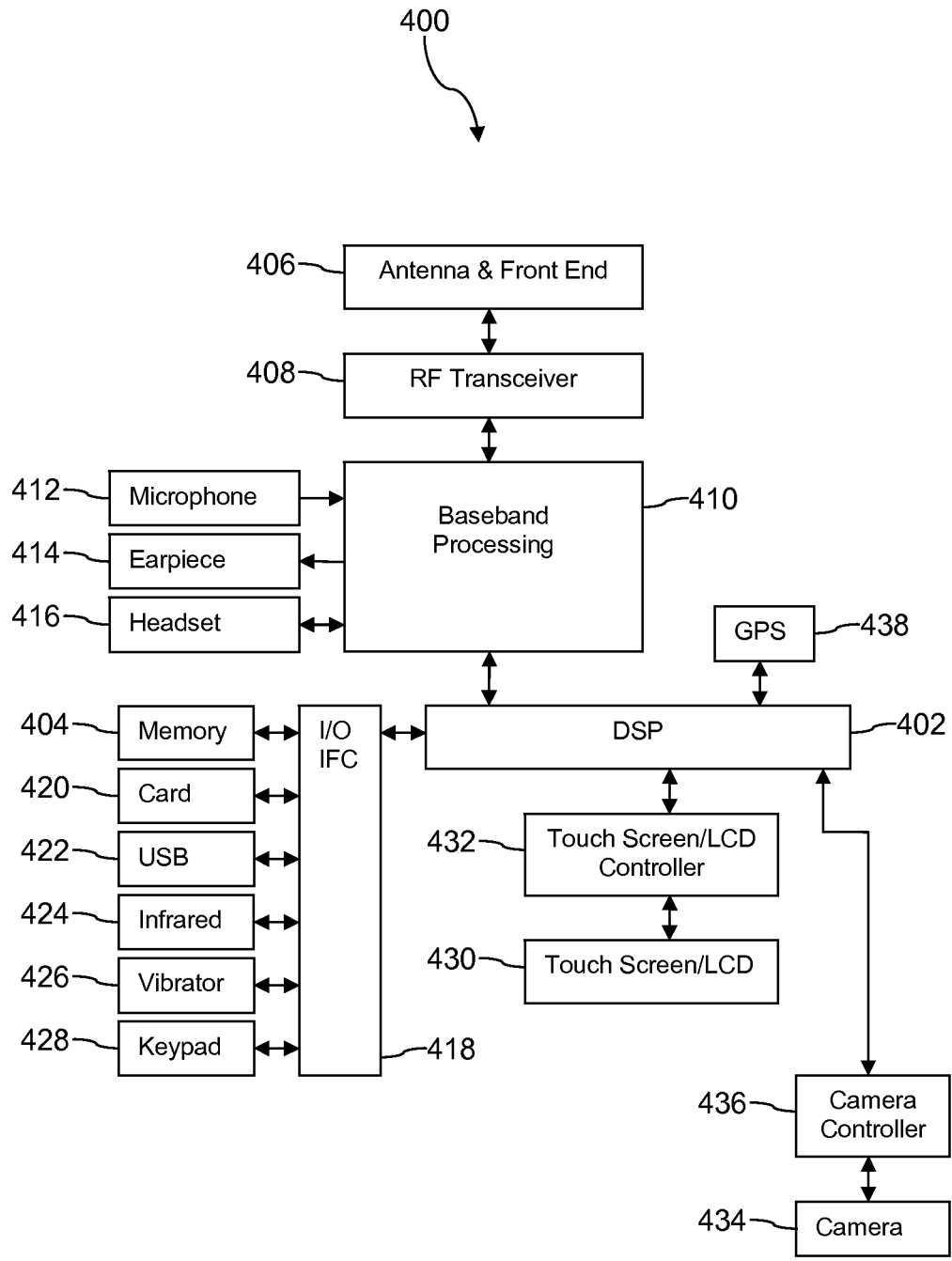
FIG. 5 is a block diagram of a mobile communication device according to an embodiment of the disclosure.

FIG. 5 shows a block diagram of a mobile device 400. While a variety of known components of handsets are depicted, in an embodiment a subset of the listed components and/or additional components may be included in the mobile device 400. The mobile device 400 includes a digital signal processor (DSP) 402 and a memory 404. As shown, the mobile device 400 may further include an antenna and front end unit 406, a radio frequency (RF) transceiver 408, a baseband processing unit 410, a microphone 412, an earpiece speaker 414, a headset port 416, an input/output interface (I/O IFC) 418, a removable memory card 420, a universal serial bus (USB) 422, an infrared port 424, a vibrator 426, a keypad 428, a touch screen liquid crystal display (LCD) with a touch sensitive surface 430, a touch screen/LCD controller 432, a camera 434, a camera controller 436, and a global positioning system (GPS) receiver 438. In an embodiment, the mobile device 400 may include another kind of display that does not provide a touch sensitive screen. In an embodiment, the DSP 402 may communicate directly with memory 404 without passing through the input/output interface 418. Additionally, in an embodiment, the mobile device 400 may comprise other peripheral devices that provide functionality.

The DSP 402 or some other form of controller or central processing unit operates to control the various components of the mobile device 400 in accordance with embedded software or firmware stored in the memory 404 or stored in memory contained within the DSP 402 itself. In addition to the embedded software or firmware, the DSP 402 may execute other applications stored in the memory 404 or made available information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The DSP 402 may communicate with a wireless network via the analog baseband processing unit 410. In some embodiments, the communication may provide Internet connectivity, enabling a user to gain access to content on the Internet and to send and receive e-mail text messages. The input/output interface 418 interconnects the DSP 402 and various memories and interfaces. The memory 404 and the removable memory card 420 may provide software and data to configure the operation of the DSP 402. Among the interfaces may be the USB port 422 and the infrared port 424. The USB port 422 may enable the mobile device 400 to function as a peripheral device to exchange information with a personal computer or other computer system. The infrared port 424 and other optional ports such as a Bluetooth® interface or an IEEE 802.11 compliant wireless interface may enable the mobile device 400 to communicate wirelessly with other nearby handsets and/or wireless base stations.

The keypad 428 couples to the DSP 402 via the interface 418 to provide one mechanism for the user to make selections, enter information, and otherwise provide input to the mobile device 400. Another input mechanism may be the touch screen LCD 430, which may also display text and/or graphics to the user. The touch screen LCD controller 432 couples the DSP 402 to the touch screen LCD 430. The GPS receiver 438 is coupled to the DSP 402 to decode global positioning system signals, thereby enabling the mobile device 400 to determine its position.

Figure 6A:
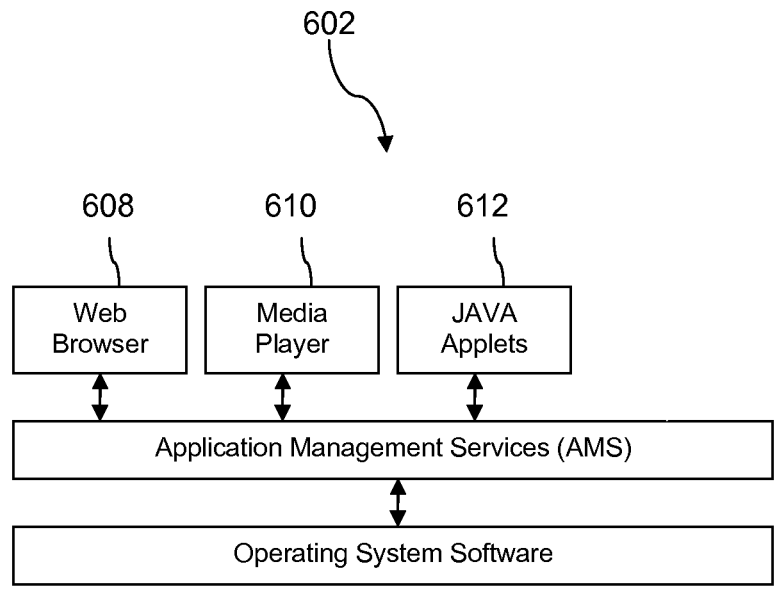
FIGS. 6A and 6B are block diagrams of software architectures for a mobile communication device according to an embodiment of the disclosure.

FIG. 6A illustrates a software environment 602 that may be implemented by a DSP 402. The DSP 402 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, JAVA applets 612, and a builder application 614 which may contain branding framework. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
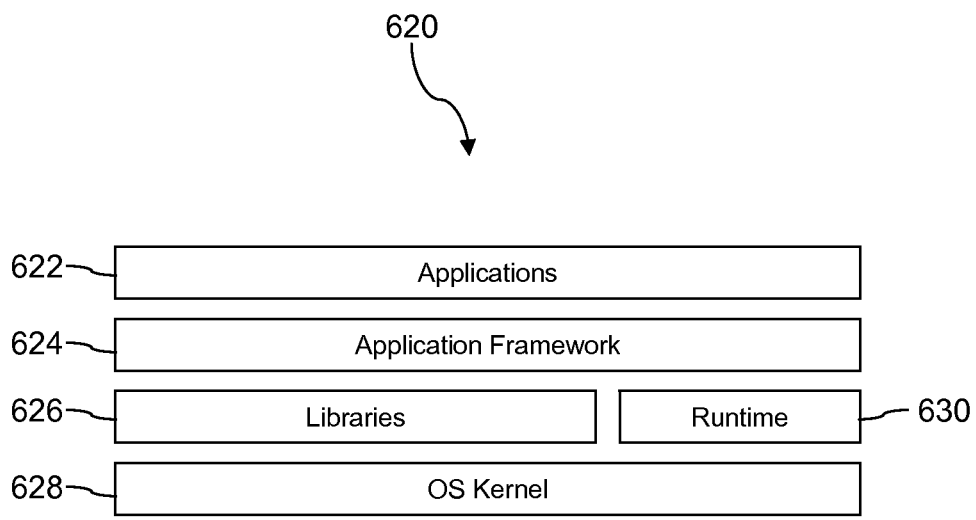

FIG. 6B illustrates an alternative software environment 620 that may be implemented by the DSP 402. The DSP 402 executes operating system software 628 (for example an operating system kernel) and an execution runtime 630. The DSP 402 executes applications 622 that may execute in the execution runtime 630 and may rely upon services provided by the application framework 624. Applications 622 and the application framework 624 may rely upon functionality provided via the libraries 626.

Figure 7:
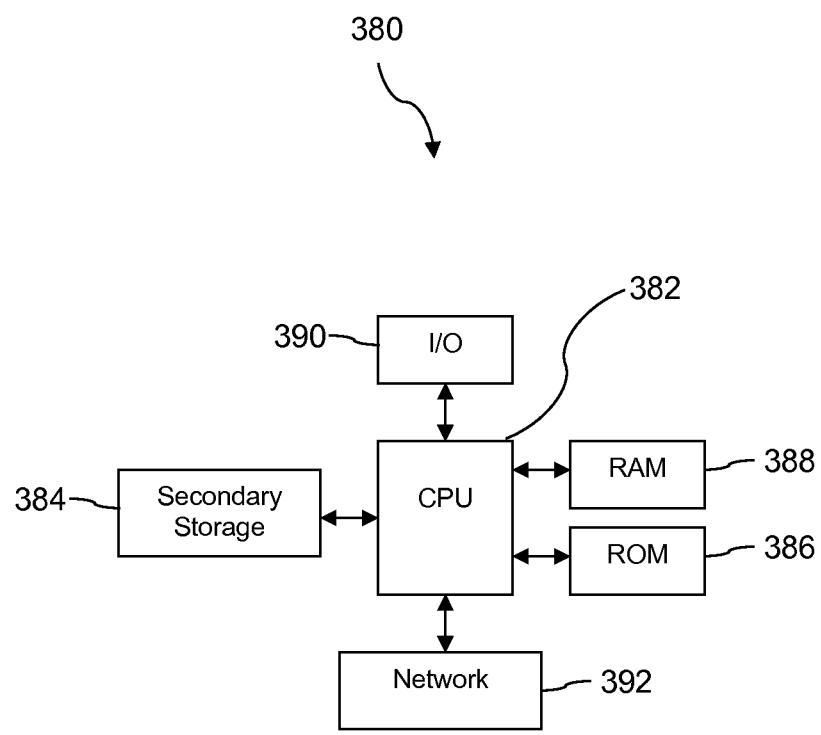
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new application specific integrated circuit is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of retrofitting a branding framework into a mobile communication device, comprising:
    determining, by a server executing at least one processor, an amount of memory of the mobile communication device to allocate to creating a carrier memory partition on the mobile communication device, the mobile communication device being associated with a current brand prior to creation of the carrier memory partition;
    identifying, by the server, memory of the mobile communication device allocated to a system memory partition of the mobile communication device for reallocating to the carrier memory partition;
    creating, by the server, upgrade instructions that, when executed by at least one processor on the mobile communication device,
        reduce the amount of memory in the mobile communication device allocated to the system memory partition,
        after reducing the amount of memory allocated to the system memory partition, create a carrier memory partition in the mobile communication device at least in part from the reduced amount of memory allocated to the system memory partition, and
        install the branding framework application into the system memory partition, wherein the branding framework application is configured to change the mobile communication device from the current brand to a different brand via the carrier partition, and wherein at least some information related to the current brand of the mobile communication device is stored in the carrier partition subsequent to changing the mobile communication device to the different brand; and
    wirelessly transmitting the upgrade instructions to the mobile communication device.

2. The method of claim 1, wherein the mobile communication device is one of a mobile phone, a personal digital assistant (PDA), a media player, a laptop computer, a tablet computer, or a notebook computer.

3. The method of claim 1, wherein the upgrade instructions are wirelessly transmitted to the mobile communication device using a cellular communication protocol.

4. The method of claim 3, wherein the cellular communication protocol is one of a code division multiple access (CDMA) protocol, a global system for mobile communication (GSM) protocol, a long-term evolution (LTE) protocol, or a worldwide interoperability for microwave access (WiMAX) protocol.

5. The method of claim 1, wherein the upgrade instructions further reduce the amount of memory in the mobile communication device allocated to a user memory partition and wherein the upgrade instructions further create the carrier memory partition at least in part from the reduced amount of memory allocated to the user system memory partition.

6. The method of claim 5, further comprising:
storing information from a user partition of the mobile communication device; and
after the mobile communication device has completed a rebranding to a different brand, transmitting the information from the user partition to the mobile communication device, whereby the mobile communication device is able to retain without loss the transmitted information from the user partition.

7. The method of claim 1, wherein the branding framework is configured to operate upon an open mobile alliance device management (OMA DM) payload transferred to the mobile communication device pursuant to rebranding the mobile communication device.

8. A method of retrofitting a branding framework into a mobile communication device, comprising:
wirelessly receiving, by the mobile communication device executing at least one processor, upgrade instructions associated with the branding framework, wherein the mobile communication device is associated with a current brand prior to creation of a carrier memory partition;
in response to executing the upgrade instructions on the mobile communication device, reducing, on the mobile communication device, the amount of memory in the mobile communication device allocated to a system memory partition;
after reducing the amount of memory allocated to the system memory partition, creating, on the mobile communication device, the carrier memory partition in the mobile communication device at least in part from the reduced amount of memory allocated to the system memory partition; and
installing the branding framework application into the system memory partition on the mobile communication device, wherein the branding framework application is configured to change the mobile communication device from the current brand to a different brand via the carrier partition, wherein the branding framework uses the carrier partition to store branding information related to the current brand and the different brand subsequent to changing the mobile communication device to the different brand.

9. The method of claim 8, wherein the system memory partition is reduced by deallocating at least two non-contiguous blocks of memory from the system memory partition, and the carrier memory partition is created at least in part from the at least two non-contiguous blocks of memory deallocated from the system memory partition.

10. The method of claim 8, wherein the branding information comprises information drawn from references to application stores, codes for accessing brand supported services, and video animations.

11. The method of claim 8, wherein the upgrade instructions are included as part of a maintenance release (MR) package that configures, upon execution by at least one processor, the mobile communication device according to the upgrade instructions.

12. The method of claim 8, wherein the mobile communication device is one of a mobile phone, a personal digital assistant (PDA), a media player, a laptop computer, a notebook computer, or a tablet computer.

13. The method of claim 8, wherein the upgrade instructions are wirelessly received using one of a code division multiple access (CDMA) wireless communication protocol, a global system for mobile communication (GSM) wireless communication protocol, a long-term evolution (LTE) wireless communication protocol, or a worldwide interoperability for microwave access (WiMAX) wireless communication protocol.

14. A method of retrofitting a branding framework into a mobile communication device, comprising:
wirelessly receiving, by the mobile communication device executing at least one processor, upgrade instructions associated with the branding framework, wherein the mobile communication device is associated with a current brand prior to creation of a carrier memory partition;
in response to executing the upgrade instructions on the mobile communication device:
reducing, on the mobile communication device, the amount of memory in the mobile communication device allocated to a system memory partition;
reducing, on the mobile communication device, the amount of memory in the mobile communication device allocated to a user memory partition;
after reducing the amount of memory allocated to the system memory partition and after reducing the amount of memory allocated to the user memory partition, creating, by the mobile communication device, the carrier memory partition in the mobile communication device from the reduced amount of memory allocated to the system memory partition and from the reduced amount of memory allocated to the user memory partition; and
installing the branding framework application into the system memory partition on the mobile communication device, wherein the branding framework application is configured to change the mobile communication device from the current brand to a different brand via the carrier partition, and wherein at least some information related to the current brand of the mobile communication device is stored in the carrier memory partition subsequent to changing the mobile communication device to the different brand.

15. The method of claim 14, wherein the size of the user memory partition is at least 3 times as large as the system memory partition and the system memory partition is at least 3 times as large as the carrier memory partition.

16. The method of claim 14, further comprising wirelessly receiving the branding framework application.

17. The method of claim 14, wherein the system memory partition is reduced by deallocating at least two non-contiguous blocks of memory from the system memory partition, and the carrier memory partition is created at least in part from the at least two non-contiguous blocks of memory deallocated from the system memory partition.

18. The method of claim 17, wherein the user memory partition is reduced by deallocating at least two non-contiguous blocks of memory from the user memory partition, and the carrier memory partition is created at least in part from the at least two non-contiguous blocks of the memory deallocated from the user memory partition.

19. The method of claim 18, further comprising:

copying information stored in the at least two non-contiguous blocks of the memory deallocated from the user memory partition in one of the system memory partition or in a server computer;

after copying the information, performing a system reset of the mobile communication device; and after performing the system reset of the mobile communication device, copying the information copied into one of the system memory partition or a server computer into the user memory partition.

20. The method of claim 19, further comprising:

receiving, on the mobile communication device, an open mobile alliance device management (OMA DM) payload;

storing, on the mobile communication device, at least some of the OMA DM payload contents in the carrier partition; and based on the OMA DM payload, rebranding, by the mobile communication device, the mobile communication device from a first branded device to a second branded device, wherein the rebranding is performed by the branding framework application at least in part by retrieving some of the OMA DM payload contents stored in the carrier partition, the first branded device being the mobile communication device using the current brand, and the second branded device being the mobile communication device using the different brand.

\* \* \* \* \*